UNITED STATES PATENT OFFICE.

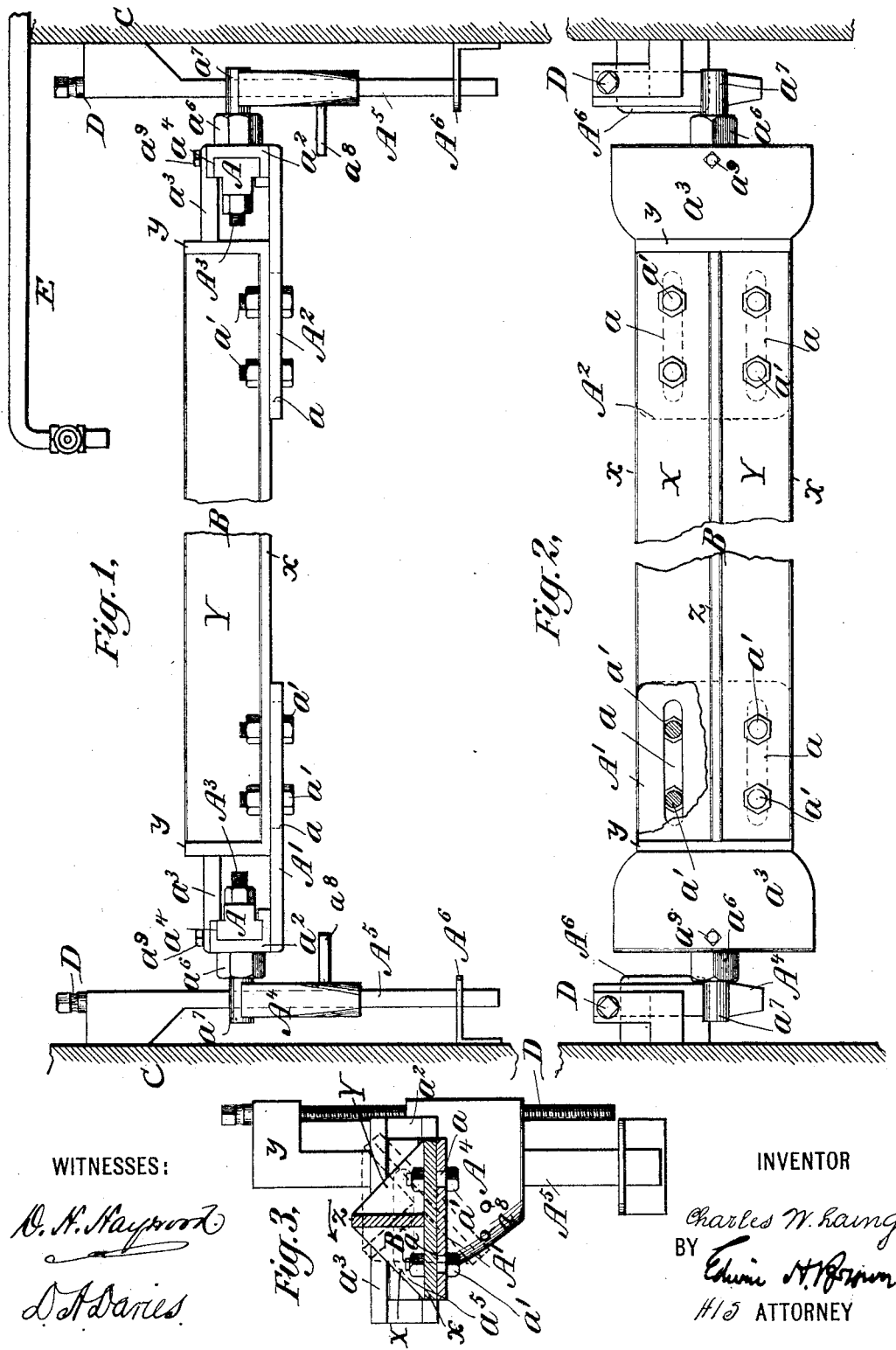

CHARLES W. LAING, OF BROOKLYN, NEW YORK.

APPARATUS FOR MANUFACTURING ACIDS.

SPECIFICATION forming part of Letters Patent No. 583,757, dated June 1, 1897.

Application filed March 6, 1896. Serial No. 582,050. (No model.)

*To all whom it may concern:*

Be it known that I, CHARLES W. LAING, of Brooklyn, in the county of Kings and State of New York, have invented a certain new and useful Improvement in Liquid-Dumps, of which the following is a specification.

This invention relates to certain new and useful improvements in liquid-dumps or measuring vessels; and it has for its object to provide a simple and accurate device whereby the continuous and automatic measuring and discharge of various liquids is effected.

A further object of the invention is to provide means for adjusting the measuring vessel or dump in various ways to insure accuracy in operation.

With these objects in view the invention consists in the novel features of construction and arrangement of the parts hereinafter described.

In the accompanying drawings, forming a part of this specification and in which like letters of reference indicate corresponding parts, Figure 1 is a side elevation of the invention.
Fig. 2 is a plan view thereof, and Fig. 3 is a transverse sectional view.

In the position shown in full lines in all of the figures of the drawings the measuring vessel or dump is at rest in a state of equilibrium, a position it never occupies in operation.

Broadly stated, my invention consists of a measuring vessel or dump divided in two compartments or chambers and mounted upon trunnions, and of stops so arranged as when one of the chambers has been filled with liquid the measuring vessel will be rocked upon its trunnion and arrested by use of the stops in a position to discharge the liquid in the chamber. Simultaneously with the discharge of the filled chamber the empty chamber is brought beneath the liquid-supply, and when it becomes filled the weight of the liquid therein rocks the measuring vessel in the opposite direction to discharge the filled chamber and to bring the chamber from which the liquid has been just previously discharged into position for refilling, this operation being repeated and the chambers of the measuring vessel being brought successively beneath the liquid-supply throughout the time the invention is in operation.

Referring more particularly to the drawings, $A'$ $A^2$ designate two plates, each having longitudinal slots $a$, through which pass bolts $a'$ for reception of nuts, whereby they may be clamped on the bottom of the measuring vessel or dump B. The longitudinal slots provide for connecting the dump at different points in the length of the plates $A'$ $A^2$, and therefore afford provision for the use of dumps of different lengths and of different capacities.

The measuring vessel or dump B may be formed in various ways; but I prefer to form it with sides $x$ and ends $y$ and a central longitudinal partition $z$, forming two equal compartments or chambers X Y.

The outer ends of the plates $A'$ $A^2$ have upwardly-extending portions $a^2$ and overhanging portions $a^3$. In the upwardly-extending portions are slideways $a^4$ and slots $a^5$. The slideways are adapted to receive slides A, and through the slots pass bolts $A^3$, provided with nuts which bear against the inner surfaces of the slides and hold them securely clamped in the positions to which they are adjusted. The overhanging portions $a^3$ are provided with set-screws $a^9$ for clamping the slides in position.

The bolts $A^3$ are provided with collars or heads $a^6$ outside the upwardly-extending portions $a^2$ of the plates $A'$ $A^2$, and beyond them the bolts are extended to form trunnions $a^7$, which support the measuring vessel or dump B and permit it to oscillate.

By adjusting the slides A one way or the other, the position of the trunnions relatively to the middle line of the dump B may be adjusted. This adjustment may be made as to both trunnions or as to one of them, so as to properly balance the dump.

The trunnions $a^7$ fit in bearings formed in blocks $A^4$, which slide up and down upon rods $A^5$, which at their upper ends are secured to tanks or other suitable supports and at their lower ends are received in brackets $A^6$. Screws or bolts D, having loose bearings on appurtenances of the rods $A^5$, pass downwardly from the same and engage with tapped holes in the blocks $A^4$. Hence by turning these screws or bolts the dump may be raised or lowered at either end to secure a proper balance.

Projecting from the inner faces of the blocks $A^4$ are studs or bearings $a^8$, which serve as stops to limit the oscillation of the dump B. E is a pipe leading from a suitable source of supply to the dump B.

From the above it will be apparent when one of the chambers X Y of the measuring vessel B is filled to a predetermined point—that is to say, when the weight of the fluid in said chamber becomes sufficient to overbalance the dump the dump will be oscillated upon its trunnions until its movement is arrested by the stops $a^8$, in which position the filled chamber is in position to fill its contents while an empty chamber is in position beneath the supply-pipe E. When this latter chamber becomes filled, the dump is moved in the opposite direction to discharge the contents of the filled chamber and to simultaneously bring the chamber whose contents has been previously discharged in position to be refilled. This operation is repeated throughout the operation of the invention.

What I claim is—

1. The combination with a liquid-supply, of an oscillating dump provided with measuring-chambers and with trunnions adjustable transversely to the horizontal axis of the dump, supporting-bearings for the trunnions, and means for limiting the oscillation of the dump, substantially as described.

2. The combination with a liquid-dump, of plates supported upon trunnions, and having longitudinal slots, and bolts passing through said slots and engaging with said dump, substantially as specified.

3. The combination with a liquid-dump, of plates to which it is secured, and trunnions adjustable forward and backward relatively to the middle line of said dump, substantially as specified.

4. The combination with a liquid-dump, of the plates $A'$ $A^2$, the slides A, means for securing said slides in different positions relatively to said plates, trunnions extending from said slides, and supports for the trunnions, substantially as specified.

5. In a measuring apparatus for liquids, the combination with a dump, trunnions connected to the dump and adjustable forward and backward with respect thereto and vertically-adjustable bearings for the trunnions, substantially as described.

6. In a measuring apparatus for liquids, the combination with a liquid-supply, of a pivoted support, a dump provided with measuring-chambers, adjustably connected to the support and detachable therefrom, said dump being adapted to oscillate to bring its measuring-chambers successively into position to receive the liquid from the supply and means for limiting the oscillation of the dump, substantially as described.

In testimony whereof I have signed my name to this specification in the presence of two subscribing witnesses.

CHARLES W. LAING.

Witnesses:
THOMAS MOONEY,
HERBERT E. WILLIAMS.